(12) United States Patent
Li et al.

(10) Patent No.: US 10,078,453 B1
(45) Date of Patent: Sep. 18, 2018

(54) STORAGE SYSTEM, COMPUTER PROGRAM PRODUCT, AND METHOD FOR MANAGING A HYBRID MEMORY DEVICE SYSTEM

(71) Applicant: INTEL CORPORATION, Santa Clara, CA (US)

(72) Inventors: Peng Li, Hillsboro, OR (US); Sanjeev N. Trika, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/460,043

(22) Filed: Mar. 15, 2017

(51) Int. Cl.
  *G06F 12/00* (2006.01)
  *G06F 3/06* (2006.01)
  *G06F 12/02* (2006.01)
  *G06F 17/30* (2006.01)
  *G06F 12/1027* (2016.01)

(52) U.S. Cl.
  CPC .............. *G06F 3/061* (2013.01); *G06F 3/064* (2013.01); *G06F 3/0616* (2013.01); *G06F 3/0631* (2013.01); *G06F 3/0679* (2013.01); *G06F 12/0246* (2013.01); *G06F 17/30091* (2013.01); *G06F 17/30218* (2013.01); *G06F 12/1027* (2013.01); *G06F 2212/1016* (2013.01); *G06F 2212/1036* (2013.01); *G06F 2212/214* (2013.01); *G06F 2212/7202* (2013.01)

(58) Field of Classification Search
  None
  See application file for complete search history.

(56) References Cited

U.S. PATENT DOCUMENTS

| | | | |
|---|---|---|---|
| 9,448,922 B2 | 9/2016 | Trika et al. | |
| 9,830,106 B2 * | 11/2017 | Le | G06F 3/0647 |
| 2009/0172308 A1 * | 7/2009 | Prins | G06F 13/1657 |
| | | | 711/154 |

(Continued)

OTHER PUBLICATIONS

Rusling, D.A., "Chapter 9: The File System", [online], [Retrieved on Feb. 9, 2017]. Retrieved from the Internet at <URL: http://www.tldp.org/LDP/tlk/fs/filesystem.html#tth_sEc9.1.4>, © 1996-1999 David A Rusling, Total 17 pp.

(Continued)

*Primary Examiner* — Brian Peugh
(74) *Attorney, Agent, or Firm* — Konrad Raynes Davda & Victor LLP; David Victor

(57) ABSTRACT

Provided are a computer program product, system and method for managing read/write operations in a hybrid memory device system. Determinations are made of an available physical address in a first memory device for a data block to allocate for metadata for a file or directory in a file system and a first logical address corresponding to the available physical address in a first range of logical addresses. Determinations are made of an available physical address in a second memory device for a data block to allocate for the file or directory in the file system and a second logical address corresponding to the available physical address in the second memory device in a second range of logical addresses. The second logical address is used to access the data block allocated to the file or directory in the file system.

25 Claims, 9 Drawing Sheets

(56) References Cited

U.S. PATENT DOCUMENTS

2012/0117303 A1* 5/2012 Carannante ......... G06F 12/0246
　　　　　　　　　　　　　　　　　　　　　　711/103

OTHER PUBLICATIONS

"CSE 451: Operating Systems Section 8", [online], [Retrieved on Feb. 11, 2017]. Retrieved from the Internet at <URL: https://courses.cs.washington.edu/courses/cse451/15wi/sections/section8.pdf>, Total 16 pp.

Poirier, D., "The Second Extended File System", [online], [Retrieved on Mar. 14, 2017]. Retrieved from the Internet at <URL: http://www.nongnu.org/ext2-doc/ext2.html>, Copyright © 2001-2011, Total 31 pp.

Wikipedia, "ext2", [online], [Retrieved on Mar. 14, 2017]. Retrieved from the Internet at <URL: https://en.wikipedia.org/wiki/Ext2>, last modified on Feb. 16, 2017, Total 4 pp.

Wikipedia, "inode", [online], [Retrieved on Mar. 14, 2017]. Retrieved from the Internet at <URL: https://en.wikipedia.org/wiki/Inode>, last modified on Nov. 14, 2016, Total 3 pp.

* cited by examiner

File Metadata

Defragmentation Unit

Memory Device Logical Address Information

US 10,078,453 B1

STORAGE SYSTEM, COMPUTER PROGRAM PRODUCT, AND METHOD FOR MANAGING A HYBRID MEMORY DEVICE SYSTEM

TECHNICAL FIELD

Embodiments described herein generally relate to a storage system, computer program product, and method for managing hybrid memory device system.

BACKGROUND

Conventional file systems maintain non-volatile information and data structures used to manage the file system in a storage device that is to remain persistent. The data structures and information maintained may include a superblock comprising overall metadata, such as file system type, size, status, and information about other metadata structures; inodes which comprises the structure that holds metadata for a given file (e.g., permissions, timestamps), length, and location of its constituent blocks, and, if needed, location of the file's next inode; an inode bitmap used to manage free space for inodes, where each bit specifies whether the corresponding space on the storage device (pre-reserved at filesystem creation time) is free; and data blocks comprising the actual data of the files and directories in the file system, where each file and directory may have multiple data blocks; and a data block bitmap used to indicate free space for data blocks.

BRIEF DESCRIPTION OF THE DRAWINGS

Embodiments are described by way of example, with reference to the accompanying drawings, which are not drawn to scale, in which like reference numerals refer to similar elements.

DESCRIPTION OF EMBODIMENTS

Figure 1:
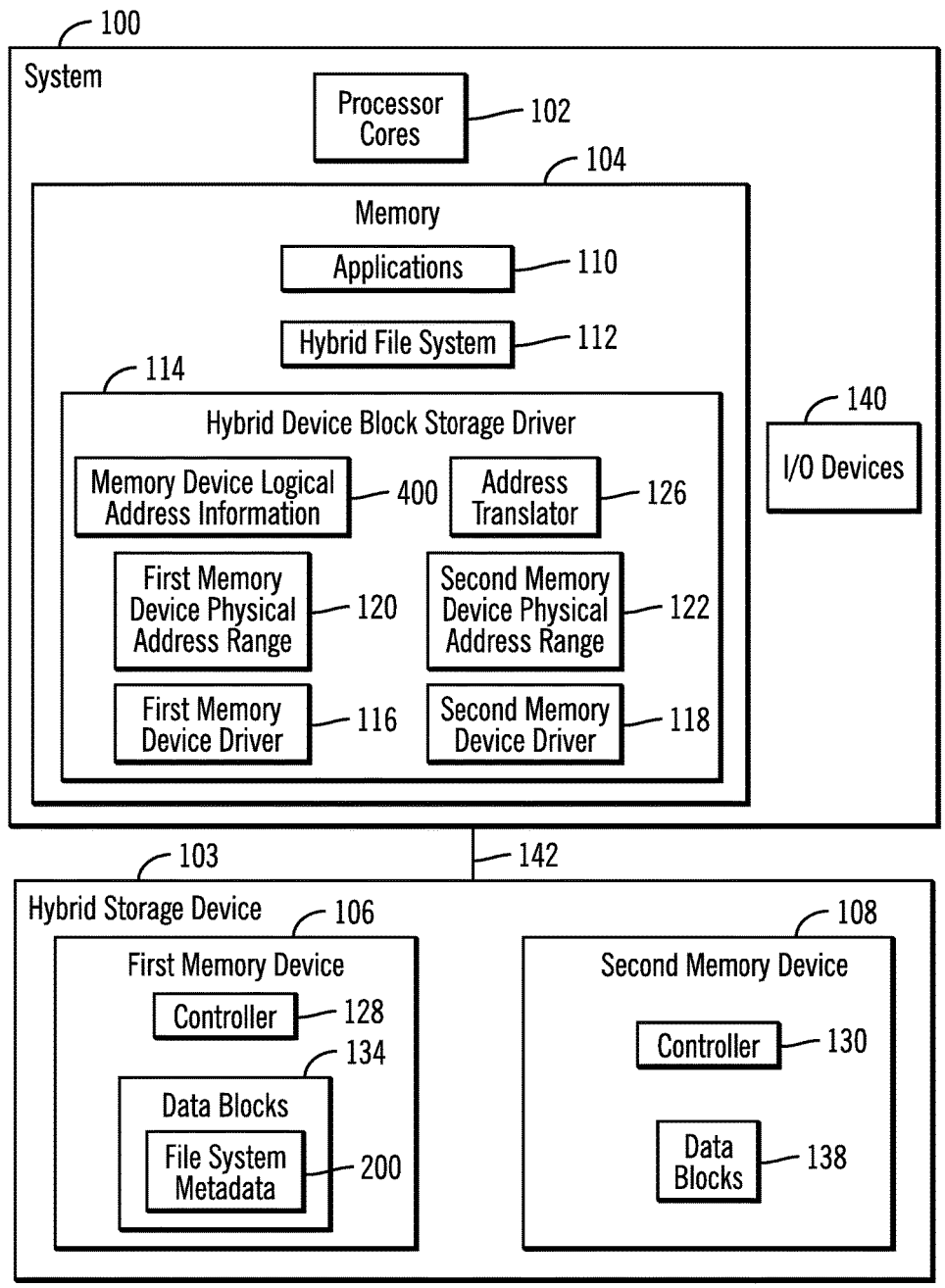
FIG. 1 illustrates an embodiment of a system including a hybrid memory device system.

The file system performs operations with respect to logical addresses that are translated to physical addresses in the storage device in which the file system metadata and data blocks are stored. When the file system metadata is stored in a NAND storage device, such as a solid state storage drive (SSD), the file system communicates file read and write requests to the inodes and file and directory data blocks having inode data, stored in the SSD using logical addresses. The SSD maintains a logical-to-physical address (L2P) lookup table or Flash Translation Table (FLT) in a memory device of the SSD, such as a Dynamic Random Access Memory (DRAM). Further, in NAND memory devices, such as SSDs, when overwriting data or metadata, the new data or metadata is written to a new free data block in a copy-on write procedure where the original data in the block to update (or overwrite) is copied into a free data block and then the original data is modified with the new write data in the few free data block. The data in the original data block is now stale or invalid.

To perform a file system operation to write a single block of a file, the following operations are performed: (1) a read-modify-write (RMW) to the file system inode bitmap once; (2) a RMW to the file system data block bitmap once; (3) a RMW to the file's inode once; (4) a RMW to the inode of the file's directory once; and (5) a write to the data block once. Further, each RMW operation to an existing inode or data block in an SSD or NAND device requires the copy-on write procedure. Yet further, most of these file system writes to file system metadata are small, single-sector writes.

There is a need in the art for improved techniques for managing file system data and performing read and write operations.

As discussed above, file system operations when block based memory is used result in a large number of single sector file system writes to the block based storage to update directory and file metadata. On some common workloads, these single sector writes are 50% plus of the data writes. On SSDs, such workloads result in a very high read-modify-write (RMW) overhead, since NAND page sizes are large (e.g., 16 KB), resulting in up to 32 times performance and endurance overhead for these approximate 50% of writes. The impact is exacerbated by write-amplification introduced on the SSD due to the random-write nature of these small writes (another 2-10 times increase in writes).

NAND based SSDs also require the use of the L2P and FTL tables that are typically maintained in byte addressable volatile memory, such as DRAM in the SSD, requiring approximately 1 MB of DRAM per GB of NAND capacity. This introduces a cost overhead for SSDs of approximately $200 for 16 TB SSDs. There are also cost overheads for capacitors and higher-processor requirements associated with the SSD algorithms, especially related to L2P management, defragmentation and power-loss-recovery (PLR). Further, indirection in the SSD using the indirection tables, e.g., L2P and FTT tables, requires significant processor resources to perform indirection, defragmentation, and power-loss-recovery (PLR) algorithms, which significantly increases SSD complexity.

Described embodiments provide techniques to improve the performance of file system operations when a storage device performing copy-on write operations is used, such as an SSD, by providing a hybrid storage device using two different non-volatile memory devices, such as a less intensive write-in place non-volatile memory for metadata and a different type of non-volatile memory more suitable for storing large amounts of data, such as block based non-volatile memory in an SSD. By placing the metadata on the more write efficient byte-addressable write-in place non-volatile memory device requiring fewer write operations, performance can be greatly improved because a large number of file system operations involve writes to the metadata.

Data may be separately stored on the other type of memory device, such as a block-based non-volatile memory, for example, NAND in an SSD, which may perform copy-on write operations, which is more suitable for larger write operations for large amounts of data, as opposed to numerous small single-sector writes.

Further, with described embodiments, a hybrid file system and hybrid storage device driver may direct read/write access to metadata to a first memory device and to data blocks for files and metadata to the second memory device. Further, the hybrid file system and storage driver may perform the address translation to present to the operating system and applications the storage space of both the first and second memory devices in the hybrid storage system as a single contiguous logical address space. Implementing the address translation in the system software avoids the need to implement indirection tables in the second memory device, such as a block-based non-volatile memory, for example, NAND in an SSD, and avoid the need to use significant computational resources to perform indirection and translate logical-to-physical addresses. The described embodiments further reduce the amount of DRAM needed in the memory storage device used in the hybrid storage system by removing address translation and defragmentation management which would otherwise consume significant DRAM resources.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage device electronic assemblies. Embodiments include both devices and methods for forming electronic assemblies.

FIG. 1 illustrates an embodiment of a system 100 having one or more processor cores 102 and a system memory 104. The system 100 may utilize a hybrid storage device 103 comprising a first memory device 106 and a second memory device 108. The memory 104 includes one or more applications 110 issuing requests to create, write, modify and read files maintained by a hybrid file system 112. A hybrid device block storage driver 114 manages access to the first 106 and second 108 memory devices in the hybrid storage device 103, to present as a single contiguous logical address storage space to the hybrid file system 112. The hybrid device block storage driver 114 includes a first memory device driver 116 to interface with the first memory device 106 and a second memory device driver 118 to interface with the second memory device 108. During system 100 initialization, the hybrid device block storage driver 114 discovers a first memory device physical address range 120 and a second memory device physical address range 122, and presents a single contiguous logical address space based on the physical address ranges 120 and 122 of the first 106 and second 108 memory devices. The logical memory device address information 400 provides information on a single logical address range corresponding to the first 120 and second 122 memory device physical address ranges. The hybrid device block storage driver 114 further includes an address translator 126 to translate between the logical addresses defining a contiguous space of logical addresses and the first 120 and second 122 ranges of physical addresses.

The first 106 and second 108 memory devices include controllers 128 and 130, respectively, to manage requests for the memory devices 106 and 108, respectively. The first memory device data blocks 134 store file system metadata 200 providing information to perform file management operations and the file/directory metadata generated to represent files and directories in the hybrid file system 112. In certain embodiments, the file/directory metadata 200 may comprise inode data structures. In alternative file system embodiments, different metadata data structures may be used.

A directory inode may identify a data block in the second memory device 108 at which directory information is maintained, such as next level, child sub-directories from the directory and files in the directory identified by the directory inode. A file inode may identify file data blocks in the second memory device 108 used to store the file data. An inode, which comprises file metadata, holds the metadata for a file or directory (e.g., permissions, timestamps), length, and location of its constituent blocks, and, if needed, location of the directory or files next inode. The term inode as used herein refers to any type of file or directory metadata.

The second memory device 108 may store data blocks 138 allocated to file/directory metadata and to files to store user data. In this way, file system data is bifurcated, such that metadata 200 for the hybrid file system 112 are stored in the first memory device 106 and the data blocks 138 for file data and metadata are stored in the second memory device 108.

The second memory device 108 may also include a cache to cache data, such as a Dynamic Random Access Memory (DRAM).

In the embodiment of FIG. 1, the first memory device 106 and second memory device 108 are shown as included in a hybrid storage device 103. In alternative embodiment, the first memory device 106 and second memory device 108 may be in separate enclosures as separate device separately coupled to the system 100.

In the embodiment of FIG. 1, the hybrid device block storage driver 114 is shown as implemented in the system 100. In alternative embodiments, some or all of the operations described with respect to the hybrid device block storage driver 114 components may be implemented in the hybrid storage device 103.

The hybrid file system 112 may issue file system read and write requests and requests to allocate data blocks 134 for file/directory metadata and for file and metadata data blocks 138 that are dependent on the operation requirements for the different memory devices 106, 108. The hybrid device block storage driver 114 may then translate those commands into memory device specific commands. For instance, the first memory device 106 may update a data block 134 by writing to the same physical address having the original data, whereas the second memory device 108 may always write updated data for a data block 138 to a next available location, and invalidate the previous location of that data. In such case, the hybrid file system 112 and/or hybrid device block storage driver 114 would transfer the write command for the first memory device 106 to perform an update at the requested location. However, for a write request to the second memory device 108, the hybrid file system 112 and/or hybrid device block storage driver 114 would have to perform multiple copy operations for copy-on write to allocate a new data block for the updated data and invalidate the previous data block having the previous version of the data being updated.

The system may further include Input/Output (I/O) devices 140, such as input controls (e.g., keyboards, mice, touch screen), display monitors, storage devices, etc.

The first 106 and second 108 memory devices may communicate with the system 100 over a common interface 142, such as a Peripheral Component Interconnect Express (PCIe) bus or other type of bus or interface or separate interfaces.

In one embodiment, both the first 106 and second 108 memory devices may be comprised of different types of non-volatile memory storage, where the first memory device 106 provides a smaller and faster access memory storage than the secondary memory 108. For instance, the first memory device 106 may be comprised of a byte addressable write-in-place memory such as a three-dimensional (3D) Xpoint (crosspoint) memory, phase change memory (PCM), memory that incorporates memristor technology, Magnetoresistive random-access memory (MRAM), Spin Transfer Torque (STT)-MRAM, SRAM storage devices, a ferroelectric random-access memory (FeTRAIVI), nanowire-based non-volatile memory, and a Non-Volatile Direct In-Line Memory Modules (DIMMs) with byte-addressable write-in-place memory, etc.

The second memory device 108 may be comprised of a of block addressable non-volatile memories for example, dies (e.g., single level cell (SLC), multi-level cell (MLC), triple level cell (TLC) NAND memories, etc.). Other non-volatile memory and storage devices may also be used for the first 106 and second 108 memory devices. In one embodiment, the first memory device 106 may allow for applying updated data to the current location for that data, while the second memory device 108 may perform a copy-on write to apply updates to a new data block.

Figure 2:
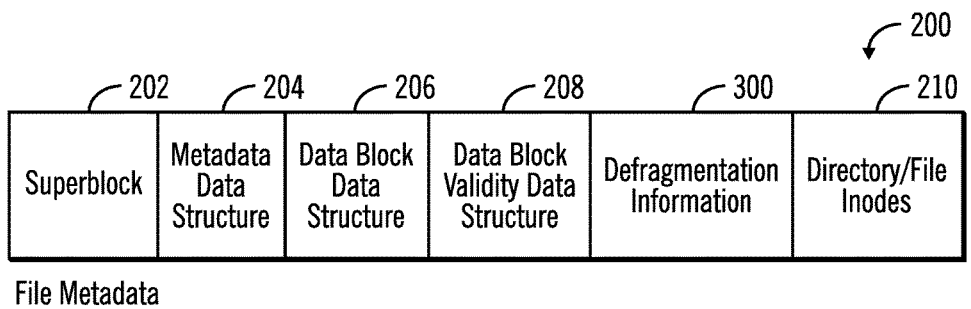
FIG. 2 illustrates an embodiment of file metadata.

FIG. 2 illustrates an embodiment of the file system metadata 200 as including a superblock 202 providing overall metadata, such as the file system type, size, status, and information about other metadata structures; a metadata data structure 204, such as a bitmap, including an indicator for each data block in the first memory device 106 indicating whether the data block is free or used; a data block data structure 206, such as a bitmap, including an indicator for each data block in the second memory device 108 indicating whether the data block is free or used; a data block validity data structure 208, such as a bitmap, including an indicator for each data block in the second memory device 108 indicating whether the data block has valid or invalid data; defragmentation information 300 on data blocks in the second memory device 108 to use to determine which data blocks to defragment; and the directory and file inodes (i.e., metadata) 210.

Figure 3:
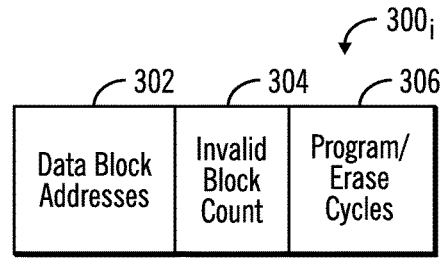
FIG. 3 illustrates an embodiment of a defragmentation unit.

FIG. 3 illustrates an embodiment of an instance of defragmentation information $300_i$ in the defragmentation information 300 for a defragmentation unit that groups one or more data blocks in the second memory device 108 subject to defragmentation, and includes the data block addresses 302, such as logical or physical addresses, in the second memory device 108 grouped by the defragmentation unit $300_i$; an invalid block count 304 indicating a number of invalid blocks in the defragmentation unit $300_i$; and program/erase cycles count 306 performed with respect to the data block addresses 302 of the defragmentation unit 300.

The defragmentation information 300 and data block validity data structure 208 are used in embodiments where the second memory device 108 is a copy-on write device where data is always written to a blank page or data block. The data blocks that are updated with new data written to a new location are marked as invalid and eligible for defragmentation to free the data blocks having the stale data.

Figure 4:
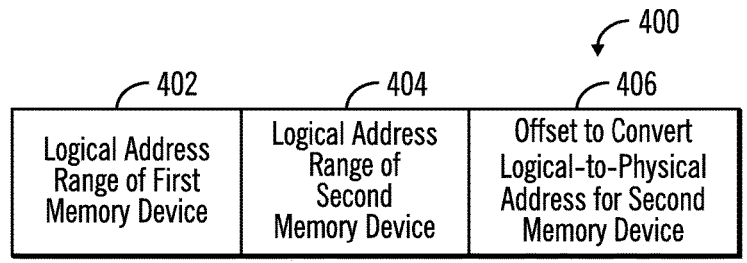
FIG. 4 illustrates an embodiment of memory device logical address information.

FIG. 4 illustrates an embodiment of memory address logical device information 400 the hybrid device block storage driver 114 may generate based on the discovered first 120 and second 122 memory device physical address ranges, including a logical address range of the first memory device 402, where the logical addresses are the same as the physical addresses for the first memory device 106; a logical address range of the second memory device 404 which starts from the logical address following the last logical address of the range 402 for the first memory device 106, and extends for the second memory device physical address range 122; and an offset 406 used by the address translator 126 to translate or convert a logical address in the second range of logical addresses 404 to the corresponding physical address in the second memory device 108. In certain embodiments, the logical address in the second logical address range 404 is converted to the physical address by subtracting the offset from the logical address. The physical and logical address ranges may be defined by a first and last addresses in the range.

Figure 5:
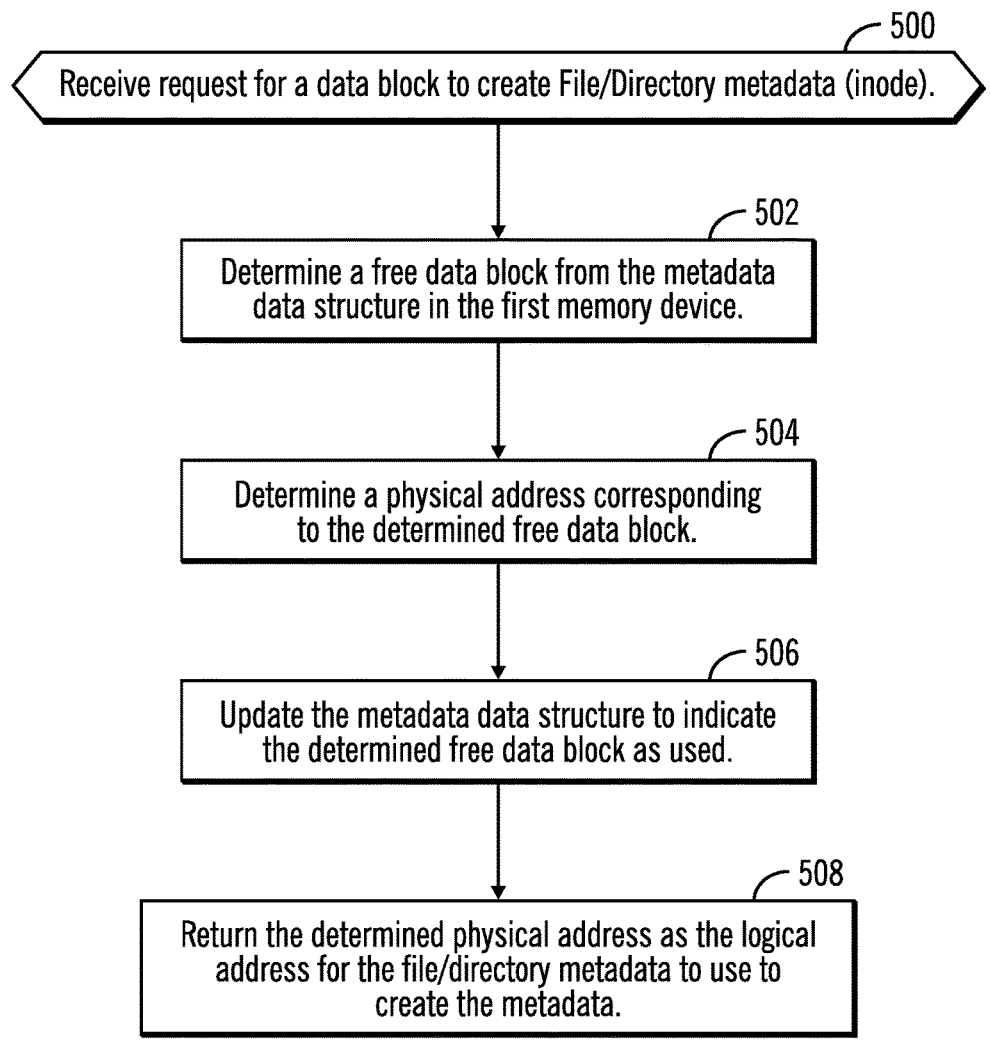
FIG. 5 illustrates an embodiment of operations to process a request for a data block for metadata or for file data.

FIG. 5 illustrates an embodiment of operations performed by the hybrid device block storage driver 114 in response to receiving a request for a data block 134 to create file/directory metadata 210, such as an inode. Upon receiving the request, the hybrid device block storage driver 114 determines (at block 502) a free data block from the metadata data structure 204 in the first memory device 106. The hybrid device block storage driver 114 determines (at block 504) a physical address in the first memory device 106 that corresponds to the determined free data block 138 from the metadata data structure 204 and updates (at block 506) the metadata data structure 204 to indicate the determined free data block 138 as used for the file/directory inode 210 to create. The hybrid device block storage driver 114 returns (at block 508) the determined physical address as the logical address for the hybrid file system 112 to use to create the file/directory inodes 210.

With the operations of FIG. 5, the address translator 126 of the hybrid device block storage driver 114 would map physical addresses of the data blocks 138 of the first memory device 106 directly to logical addresses, so there is a fixed one-to-one direct mapping of logical-to-physical addresses for the first memory device 106, where the logical and physical addresses may be the same.

Figure 6:
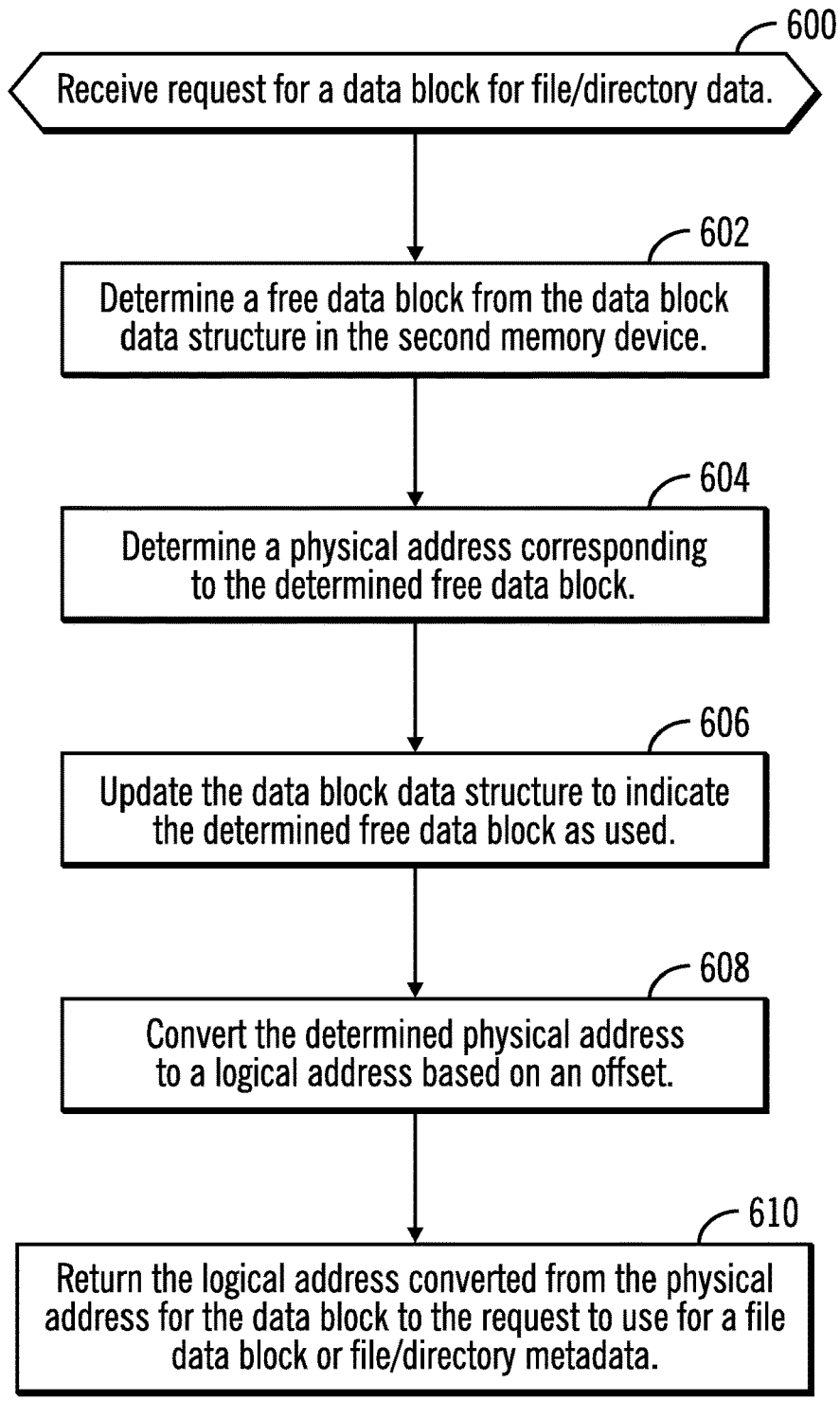
FIG. 6 illustrates an embodiment of operations to process a request for a data block to create a file/directory metadata, such as an inode.

FIG. 6 illustrates an embodiment of operations performed by the hybrid device block storage driver 114 in response to receiving a request for a data block 138 to allocate for data for a file/directory inodes 210 or for a file to store file data. Upon receiving (at block 600) the request, the hybrid device block storage driver 114 determines (at block 602) a free data block 138 in the second memory device 108 from the data block data structure 206, which is stored in the first memory device 106. The hybrid device block storage driver 114 determines (at block 604) a physical address in the second memory device 108 that corresponds to the determined free data block from the data block data structure 206 and updates (at block 606) the data block data structure 206 to indicate the determined free data block 138 as used. The address translator 126 converts (at block 608) the determined physical address to a logical address, such as based on the offset 406 by adding the offset to the determined physical address. The hybrid device block storage driver 114 returns (at block 610) the determined logical address converted from the physical address for the hybrid file system 112 to use for the data block 138 for the file or the file/directory inode 210.

With the operations of FIG. 6, the address translator 126 may use a simple calculation to transfer or convert a physical address in the second memory device 108 to a logical address, such as adding the offset 406 to the physical address. This avoids the need to use any complex indirection tables, such as a logical-to-physical table (L2P) and flash translation table (FLT), which are maintained in a volatile memory of a NAND memory device. This implementation allows the second memory device 108 to not have to implement indirection tables to perform the logical-to-physical address conversion as the conversion is performed using a simple calculation in the system 100 storage device driver. Avoiding the need to store indirection tables allows the use of a less expensive and smaller volatile memory in the second memory device 108, such as an SSD device. Additional cost overhead for the indirection table management, such as for capacitors, and processor requirements, device algorithms related to indirection table (L2P and FLT) management, defragmentation and power-loss recovery may also be eliminated in the SSD device operating as the second memory device 108.

In the described embodiments of FIGS. 5 and 6, the conversion of the physical to logical address is performed in the hybrid device block storage driver 114, such as the address translator 126. In an alternative embodiment, the address translation for the second memory device 108 may be performed by a processor component within the second memory device 108 that performs the simple conversion by adjusting a received logical address by the offset 406, e.g., subtracting the offset 406 from the received logical address. In such embodiments, the hybrid device block storage driver 114 may communicate the offset 406 to use to the second memory device 108 as a parameter to use to translate a logical address to physical address. Further, in these embodiments, the SSD does not need to maintain indirection tables or complex indirection algorithms because a simple conversion by adjusting the logical address by an offset may be used to obtain the physical address.

Figure 7:
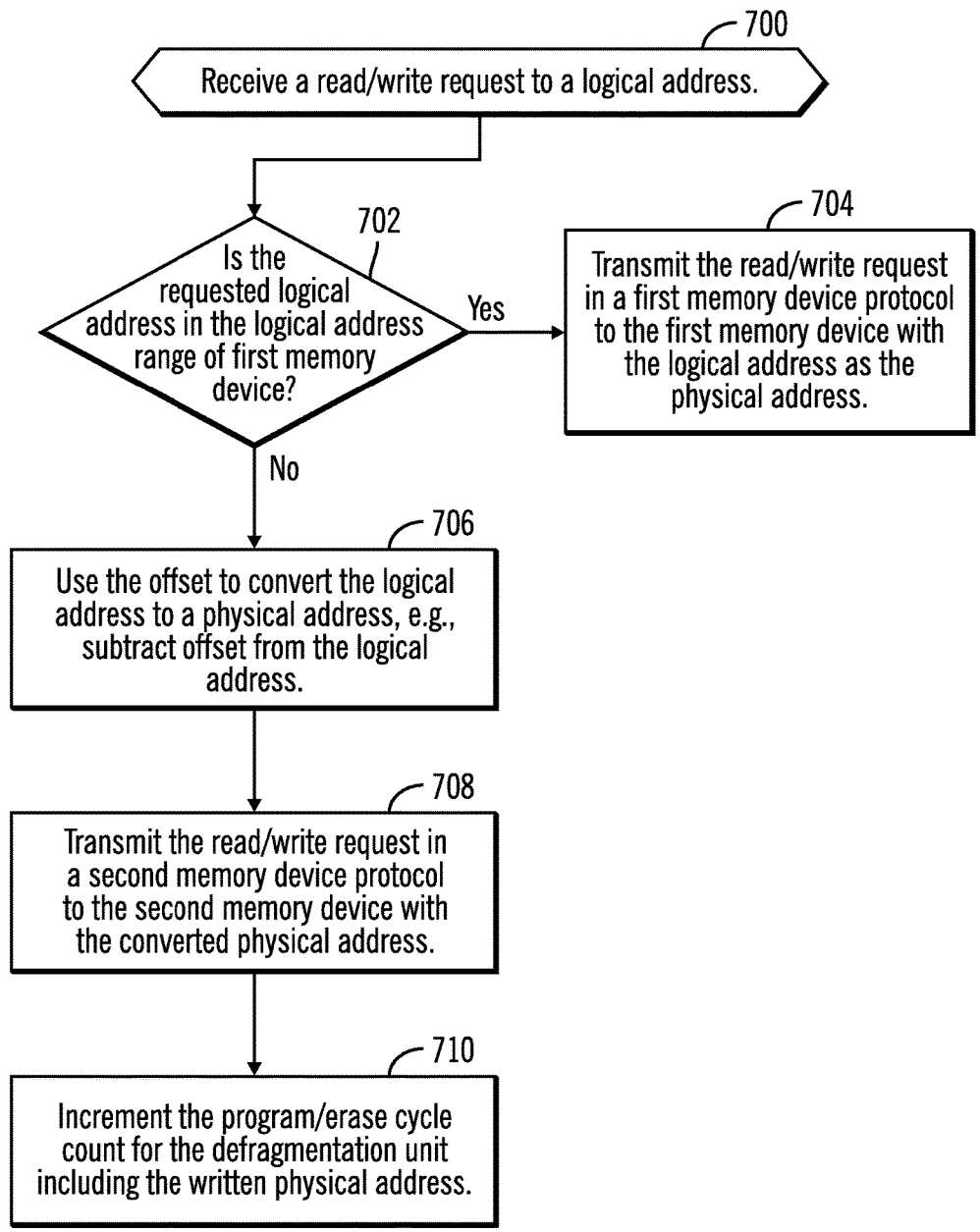
FIG. 7 illustrates an embodiment of operations to process a read/write request to a logical address.

FIG. 7 illustrates an embodiment of operations performed by the hybrid device block storage driver 114 to process a read/write request to a logical address. Upon receiving (at block 700) a read/write request to a requested logical address, if (at block 702) the requested logical address is in the logical address range of the first memory device 402, then the read/write request is transmitted (at block 704) in a first memory device protocol to the first memory device 106 with the logical address as the physical address. If (at block 702) the requested logical address is in the logical address range of the second memory device 404, then the address translator 126 uses (at block 706) the offset 406 to convert the received logical address to a physical address, such as by subtracting the offset 406. The hybrid device block storage driver 114 transmits (at block 708) the read/write request in a second memory device protocol to the second memory device 108 with the converted physical address. The program/erase cycle count 306 for the defragmentation unit $300_i$, including the written physical address in its data block addresses 302, is incremented (at block 710) for the write operation.

Figure 8:
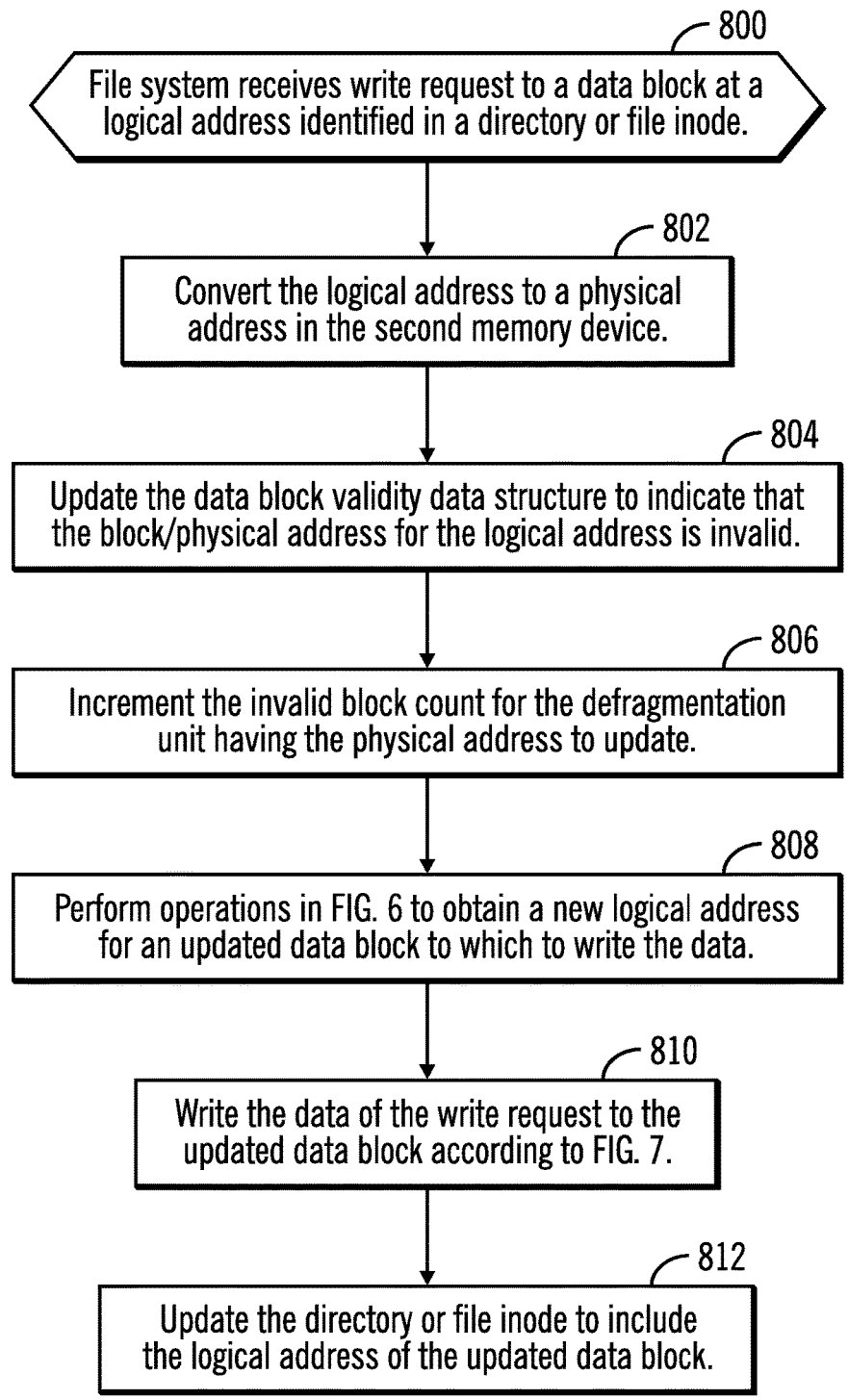
FIG. 8 illustrates an embodiment of operations to process a write request to a data block at a logical address identified in a directory or file inode.

FIG. 8 illustrates an embodiment of operations performed by the hybrid file system 112 or a combination of the hybrid file system 112 and the hybrid device block storage driver 114 to perform a write to a data block at a logical address identified in a directory or file inode. Upon receiving (at block 800) a write request to a data block at a logical address identified in a directory or file inode 210, the logical address is converted (at block 802) to a physical address in the secondary memory device 108. The hybrid file system 112 updates (at block 804) the data block validity data structure 208 to indicate that the block/physical address for the logical address is invalid. The hybrid file system 112 increments (at block 806) the invalid block count 304 for the defragmentation unit $300_i$ having the physical address to update, as indicated in the data block addresses 302 of the defragmentation unit $300_i$. The hybrid file system 112 in conjunction with the hybrid device block storage driver 114 performs (at block 808) the operations in FIG. 6 to obtain a new logical address for an updated data block to which to write the data. The hybrid file system 112 writes (at block 810) the data of the write request to the updated data block according to the operations of FIG. 7. Writing to the updated data block writes the original version of the data overwritten by the write data. The hybrid file system 112 then updates (at block 812) the directory or file inode to include the logical address of the updated data block.

Figure 9:
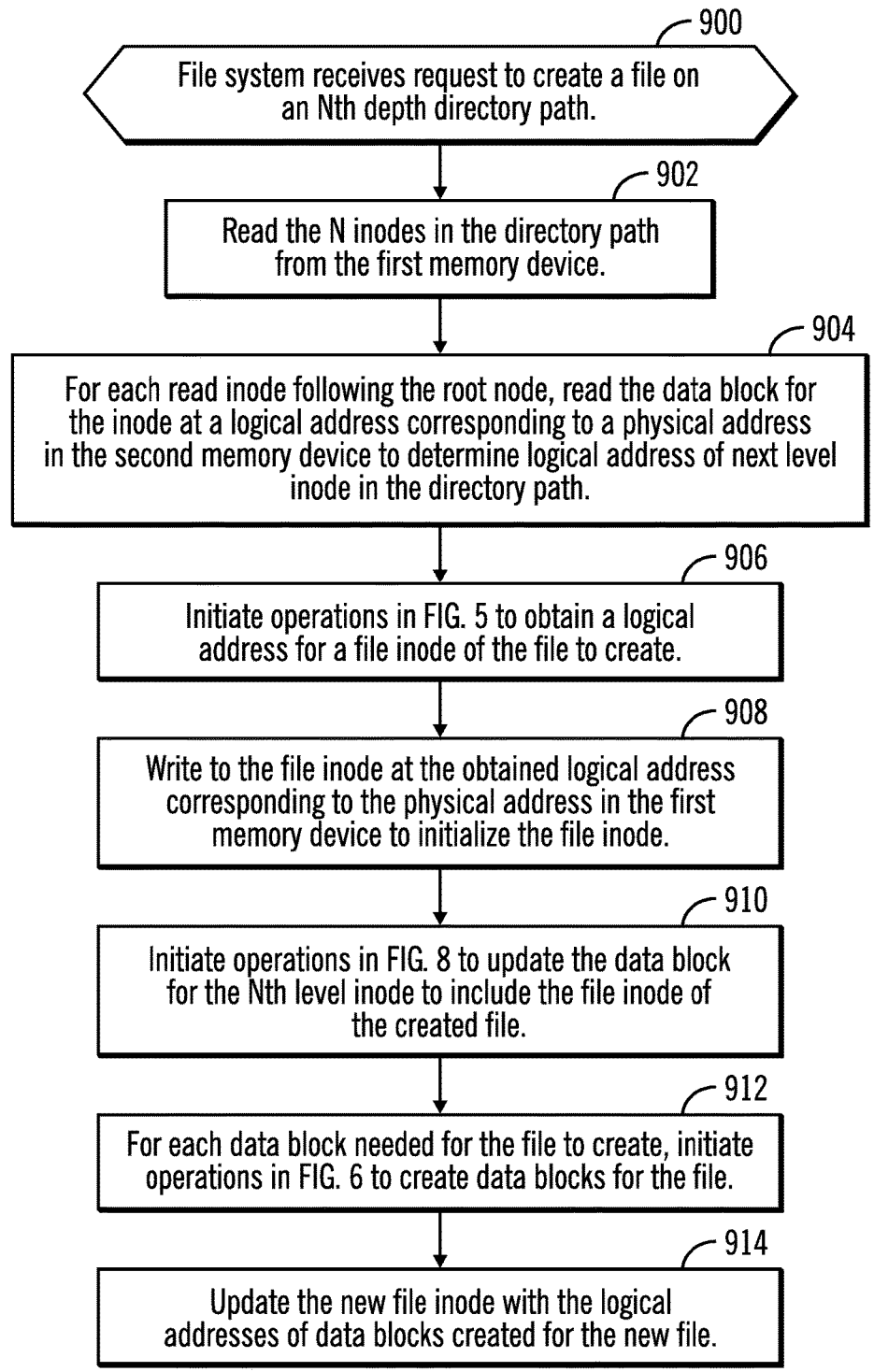
FIG. 9 illustrates an embodiment of operations to create a file on an Nth depth directory path.

FIG. 9 illustrates an embodiment of operations performed by the hybrid file system 112 to process a request to create a file at an Nth depth level directory path. Upon receiving the request to create a file on an Nth depth level directory path, the hybrid file system 112 reads (at block 902) the N inodes in the directory path from the first memory device 106. For each read inode following the root node, the hybrid file system 112 reads (at block 904) the data block for the inode at a logical address corresponding to a physical address in the second memory device 108 to determine logical address of next level inode in the directory path. The hybrid file system 112 initiates (at block 906) the operations in FIG. 5 to obtain a logical address for a file inode of the file to create and writes (at block 908) to the file inode at the obtained logical address corresponding to a physical address in the first memory device 106 to initialize the file inode. The hybrid file system 112 initiates (at block 910) the operations in FIG. 8 to update the data block for the Nth level inode to indicate the file inode of the created file as in the Nth level directory on the directory path of the file create request. For each data block needed for the file to create, the hybrid file system 112 initiates (at block 912) the operations in FIG. 6 to create data blocks for the file to create in the second memory device 108. The new file inode 210 in the first memory device 106 is updated (at block 914) with the logical addresses of the data blocks created for the new file.

Figure 10:
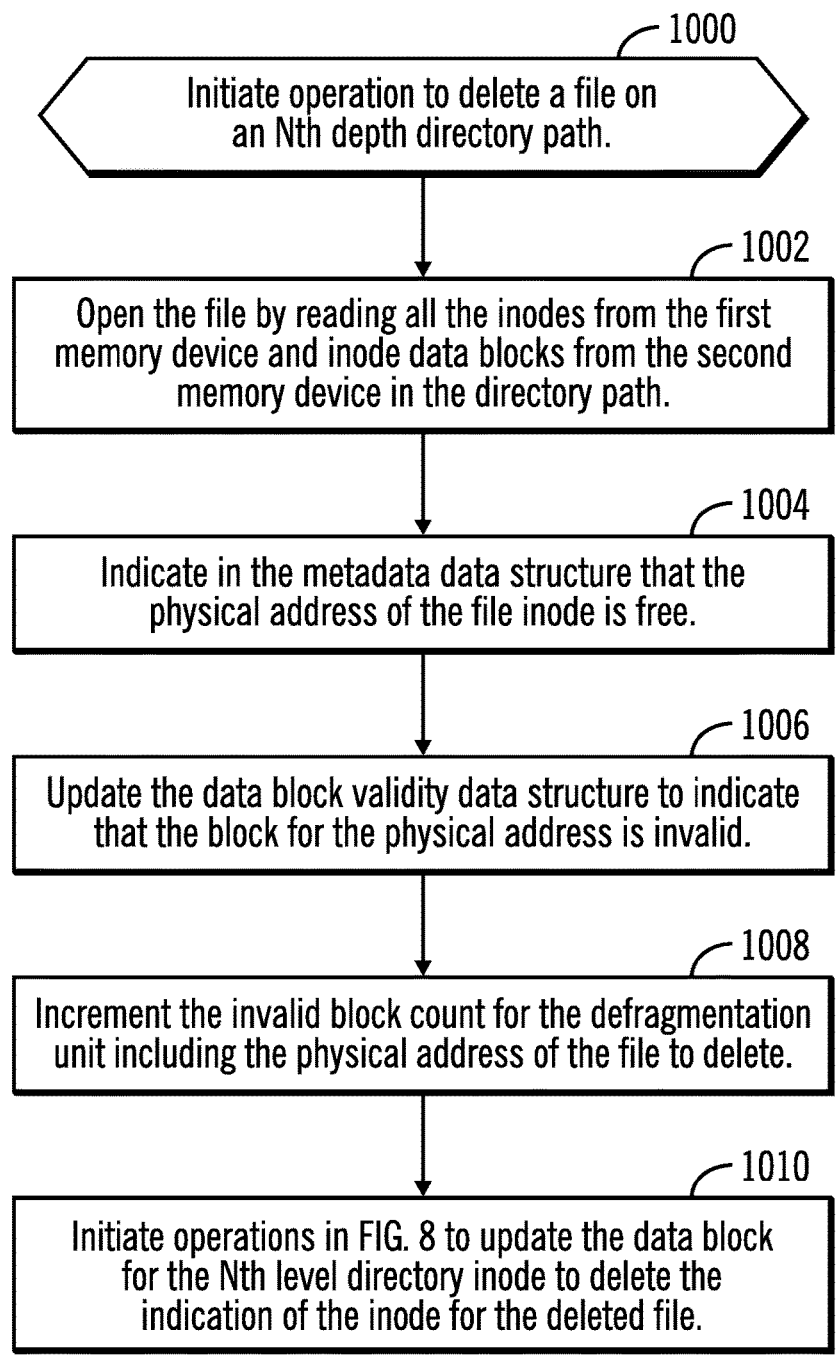
FIG. 10 illustrates an embodiment of operations to delete a file on an Nth depth directory path.

FIG. 10 illustrates an embodiment of operations performed by the hybrid file system 112 to process a request to delete a file an Nth depth level directory path. Upon initiating (at block 1000) the delete operation, the hybrid file system 112 opens (at block 1002) the file to delete by reading all the inodes from the first memory device 106 and the inode data blocks from the second memory device 108 in the directory path. The hybrid file system 112 indicates (at block 1004) in the metadata data structure 204 that the physical address of the file inode to delete is free. The data block validity data structure 208 is updated (at block 1006) to indicate that the block for the physical address being deleted is invalid. The invalid block count 304 for the defragmentation unit $300_i$, including the physical address of the file to delete in its data block addresses 302, is incremented (at block 1008). The hybrid file system 112 initiates (at block 1010) the operations in FIG. 8 to update the data block for the Nth level directory inode to delete the indication of the inode for the deleted file.

With the described embodiments of FIGS. 9 and 10, when creating and deleting a file on a file path, the hybrid file system 112 and the hybrid device block storage driver 114 perform different types of write operations for the first 106 and second 108 memory devices in the hybrid storage device 103. The hybrid file system 112 gathers defragmentation information on physical addresses/data blocks being made invalid as a result of overwriting data in the data block for an inode updated to indicate a new file or that a file is deleted, and for deleting the data blocks for a file being deleted, and when indicating a program/erase cycle when writing data to a data block in the second memory device 108. Further, the hybrid file system 112 and the hybrid device block storage driver 114 perform different types of write operations directed toward the metadata 200 maintained in the first memory device 106 and directed toward data blocks 138 in the second memory device 108 for file data and inodes 210.

Figure 11:
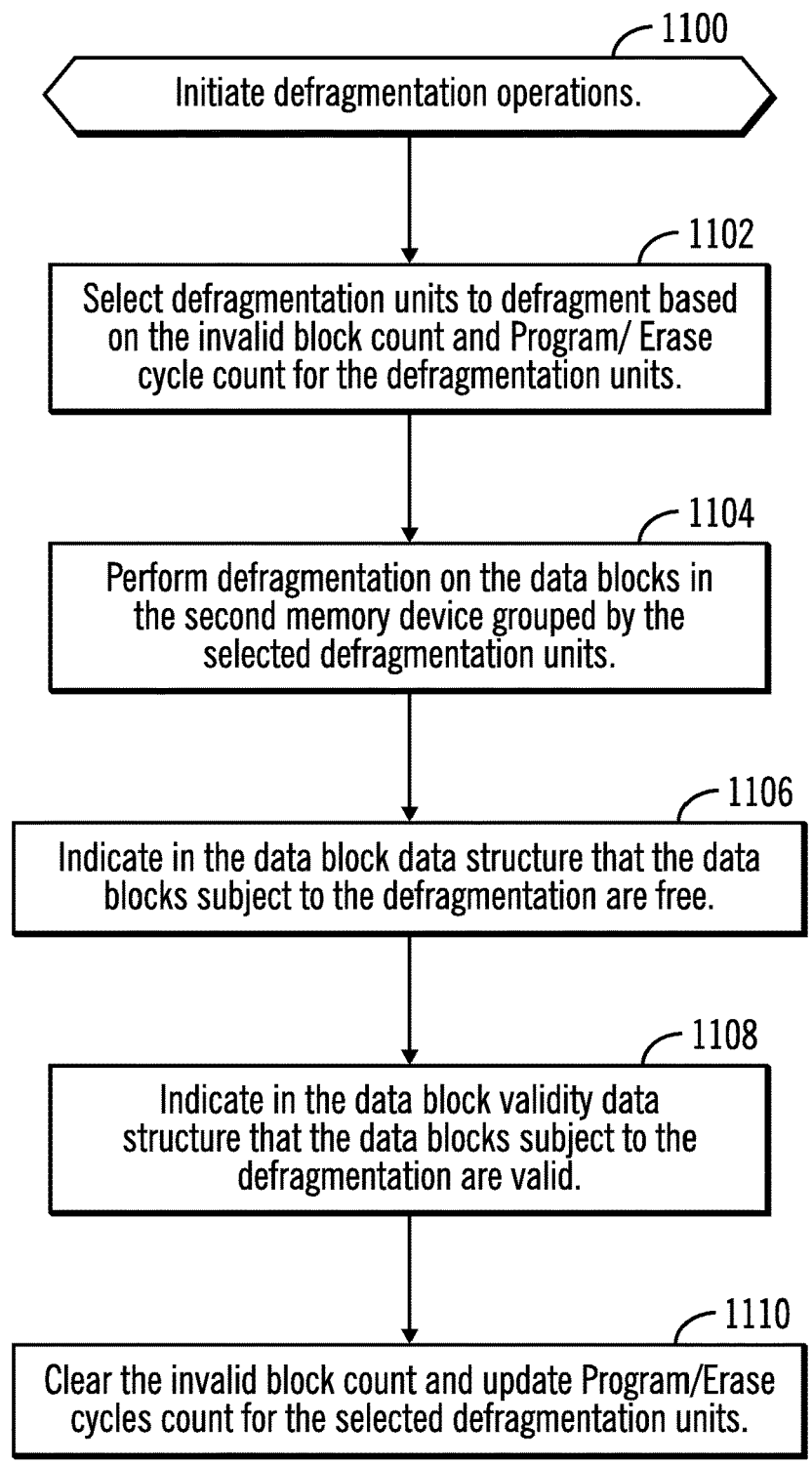
FIG. 11 illustrates an embodiment of operations to perform defragmentation.

FIG. 11 illustrates an embodiment of operations performed by the hybrid file system 112 and/or the hybrid device block storage driver 114 to perform free space management and wear leveling in embodiments where the second memory device 108 comprises a NAND storage device, where updates to a data block are written to a new location, leaving behind stale data in the data block that needs to be freed. The hybrid file system 112 may periodically initiate free space/defragmentation operations. Upon initiating (at block 1100) a free space/defragmentation operation, the hybrid file system 112 (or hybrid device block storage driver 114) selects (at block 1102) defragmentation units $300_i$ to defragment based on the invalid block count 304 s and Program/Erase cycle counts 306 for the defragmentation units $300_i$. Defragmentation units $300_i$ are preferred for selection that have higher invalid block count 304, to free stale data, and higher Program/Erase cycle counts 306 for wear leveling purposes. Defragmentation is performed (at block 1104) on the data blocks in the second memory device 108 grouped by the selected defragmentation units $300_i$. The hybrid file system 112 indicates (at block 1106) in the data block data structure 206 that the data blocks subject to the defragmentation are free and indicates (at block 1108) in the data block validity data structure 208 that the data blocks subject to the defragmentation are valid. After completing defragmentation, the invalid block count 304 and Program/Erase cycles 306 are cleared (at block 1110) for the selected defragmentation units $300_i$.

Described embodiments improve file system performance by using a hybrid storage device having a first memory device suitable for storing file system metadata and handling single sector size writes to the file system metadata while using a second memory device to store large amounts of the file data. The second memory device may operate more efficiently for larger writes by using a copy-on write methodology. However, such a copy-on write would not be as efficient for file metadata writes, which involve numerous smaller single-sector writes, as a memory device allowing in-place updates. Further, with described embodiments, by having the address translation handled in the file system or through the use of direct mapping or translation, the second memory device, such as a NAND memory device, does not need to provide DRAM space for indirection tables and complex computations for indirection and defragmentation.

The described embodiments may be implemented as a method, apparatus, device, and computer program product comprising a computer readable storage medium using standard programming and/or engineering techniques to produce software, firmware, hardware, or any combination thereof. The described operations may be implemented as code or logic maintained in a "computer readable storage medium". The term "code" as used herein refers to software program code, hardware logic, firmware, microcode, etc. The computer readable storage medium, as that term is used herein, includes a tangible element, including at least one of electronic circuitry, integrated circuit dies, storage materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), computer encoded and readable punch cards, etc. The computer readable storage medium may further comprise a hardware device implementing firmware, microcode, etc., such as in an integrated circuit chip, a programmable logic device, a Programmable Gate Array (PGA), field-programmable gate array (FPGA), Application Specific Integrated Circuit (ASIC), etc. Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer.

A computer readable storage medium is not comprised solely of transmission signals, but includes physical and tangible components. Those skilled in the art will recognize that many modifications may be made to this configuration without departing from the scope of the present invention, and that the article of manufacture may comprise suitable information bearing medium known in the art.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects.

This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

The reference characters used herein, such as i and n, are used herein to denote a variable number of instances of an element, which may represent the same or different values, and may represent the same or different value when used with different or the same elements in different described instances.

EXAMPLES

The following examples pertain to further embodiments.

Example 1 is a storage system for using different types of storage devices for metadata and file data, comprising: a hybrid storage device having a first memory device comprising a byte addressable non-volatile memory and a second memory device comprising a block addressable read-modify write non-volatile memory; and a computer readable storage medium including a computer program executed by a processor to: determine an available physical address in the first memory device for a data block to allocate for metadata for a file or directory in a file system; determine a first logical address corresponding to the available physical address in the first memory device in a first range of logical addresses corresponding to physical addresses in the first memory device; provide the first logical address to use for the metadata; determine an available physical address in the second memory device for a data block to allocate for the file or directory in the file system; determine a second logical address corresponding to the available physical address in the second memory device in a second range of logical addresses corresponding to physical addresses in the second memory device; and provide the second logical address to use to access the data block allocated to the file or directory in the file system.

In Example 2, the subject matter of examples 1 and 3-11 can optionally include that the first range of logical addresses comprise a range of the physical addresses, and wherein the second range of logical addresses comprise corresponding physical addresses adjusted by an offset.

In Example 3, the subject matter of examples 1, 2 and 4-11 can optionally include that metadata for files in the file system is only allocated logical addresses in the first range of logical addresses and wherein data blocks for the files in the file system are only allocated logical addresses in the second range of logical addresses, where the second memory device comprises a copy-on write memory device to write updates to a data block to a new data block and wherein the first memory device writes updates to a data block directly to the data block subject to an update.

In Example 4, the subject matter of examples 1-3 and 5-11 can optionally include that the computer program is further executed to: receive a read or write request to a requested logical address; in response to the requested logical address corresponding to a physical address in the first range of logical addresses, transmit the read or write request in a first memory device protocol used by the first memory device to the first memory device; and in response to the requested logical address corresponding to a physical address in the second range of logical addresses, transmit the read or write request in a second memory device protocol used by the second memory device to the second memory device, wherein the first and second memory devices comprise different types of memory devices using different memory device protocols.

In Example 5, the subject matter of examples 1-4 and 6-11 can optionally include that the read or write request in the first memory device protocol to transmit includes the requested logical address as the physical address in the read or write request, and wherein in response to the requested logical address corresponding to a physical address in the second range of logical addresses, convert the requested logical address to a corresponding physical address to include in the read or write request to transmit to the second memory device protocol.

In Example 6, the subject matter of examples 1-5 and 7-11 can optionally include that the read or write request in the first memory device protocol and the second memory device protocol to transmit includes the requested logical address, wherein the first memory device uses the requested logical address as the physical address to process the read or write request in the first memory device protocol, and wherein the second memory device adjusts the requested logical address by an offset to determine a physical address to use in the read or write request in the second memory device protocol.

In Example 7, the subject matter of examples 1-6 and 8-11 can optionally include that the computer program is further executed to: maintain a data block data structure to indicate data blocks in the second memory device as free or used, wherein the determined available physical address is for one of the data blocks indicated in the data block data structure as free; maintain a data block validity data structure to indicate whether each of the data blocks in the second memory device have valid or invalid data; and indicate in the data block validity data structure that one of the data blocks in the second memory device is invalid in response to performing a copy-on write to write an update to the data block to a new data block or deleting the data block.

In Example 8, the subject matter of examples 1-7 and 9-11 can optionally include that the computer program is further executed to: maintain defragmentation units, wherein each of the defragmentation units groups at least one data block in the second memory device; indicate, for each of the defragmentation units, a number of data blocks indicated as invalid in the data block validity data structure and a number of program/erase cycles to the data blocks; use the number of the data blocks indicated as invalid and the number of program/erase cycles for the defragmentation units to select defragmentation units to defragment; perform defragmentation with respect to the selected defragmentation units; indicate in the data block data structure that the data blocks subject to the defragmentation are free; and indicate in the data block validity data structure that the data blocks subject to the defragmentation are valid.

In Example 9, the subject matter of examples 1-8 and 10-11 can optionally include that the data block data structure, the data block invalidity data structure, and a number of program/erase cycles to the data blocks are stored in the first memory device.

In Example 10, the subject matter of examples 1-9 and 11 can optionally include the computer program is further executed to: maintain a data block data structure to indicate data blocks in the second memory device as free or used, wherein the determined available physical address comprises one of the data blocks indicated in the data block data structure as free; maintain a data block validity data structure to indicate whether each of the data blocks in the second memory device have valid or invalid data; receive a write request having write data to write to a target logical address corresponding to a target physical address in the second memory device; indicate in the data block validity data structure that the data block corresponding to the target physical address in the second memory device is invalid; determine from the data block data structure an available physical address indicated as free for an updated data block; indicate in the data block data structure that the determined available physical address of the updated data block is used; and write data in the data block at the target logical address and the write data to the updated data block.

In Example 11, the subject matter of examples 1-10 can optionally include that the metadata for files and directories in the file system are stored in data blocks in the first memory device, wherein each metadata instance for the files and directories indicates a data block in the second memory device storing data for the metadata instance, wherein the data blocks in the second memory device for metadata instances for a directory include identifiers of metadata instances of sub-directories of the directory, and wherein the data block for a metadata instance for a file indicates the data blocks storing data for the file represented by the metadata instance.

Example 12 is a computer program product for using different types of storage devices for metadata and file data, comprising a computer readable storage medium including a computer program executed by a processor and in communication with a first memory device comprising a byte addressable non-volatile memory and a second memory device a block addressable read-modify write non-volatile memory, wherein the computer program is executed to: determine an available physical address in the first memory device for a data block to allocate for metadata for a file or directory in a file system; determine a first logical address corresponding to the available physical address in the first memory device in a first range of logical addresses corresponding to physical addresses in the first memory device; provide the first logical address to use for the metadata; determine an available physical address in the second memory device for a data block to allocate for the file or directory in the file system; determine a second logical address corresponding to the available physical address in the second memory device in a second range of logical addresses corresponding to physical addresses in the second memory device; and provide the second logical address to use to access the data block allocated to the file or directory in the file system.

In Example 13, the subject matter of examples 12 and 14-18 can optionally include that the first range of logical addresses comprise a range of the physical addresses, and wherein the second range of logical addresses comprise corresponding physical addresses adjusted by an offset.

In Example 14, the subject matter of examples 12 and 15-18 can optionally include that metadata for files in the file system is only allocated logical addresses in the first range of logical addresses and wherein data blocks for the files in the file system are only allocated logical addresses in the second range of logical addresses, where the second memory device comprises a copy-on write memory device to write updates to a data block to a new data block and wherein the first memory device writes updates to a data block directly to the data block subject to an update.

In Example 15, the subject matter of examples 12-14 and 16-18 can optionally include that the computer program is further executed to: receive a read or write request to a requested logical address; in response to the requested logical address corresponding to a physical address in the first range of logical addresses, transmit the read or write request in a first memory device protocol used by the first memory device to the first memory device; and in response to the requested logical address corresponding to a physical address in the second range of logical addresses, transmit the read or write request in a second memory device protocol used by the second memory device to the second memory device, wherein the first and second memory devices comprise different types of memory devices using different memory device protocols.

In Example 16, the subject matter of examples 12-15 and 17-18 can optionally include that the read or write request in the first memory device protocol to transmit includes the requested logical address as the physical address in the read or write request, and wherein in response to the requested logical address corresponding to a physical address in the second range of logical addresses, convert the requested logical address to a corresponding physical address to include in the read or write request to transmit to the second memory device protocol.

In Example 17, the subject matter of examples 12-16 and 18 can optionally include that the computer program is further executed to: maintain a data block data structure to indicate data blocks in the second memory device as free or used, wherein the determined available physical address is for one of the data blocks indicated in the data block data structure as free; maintain a data block validity data structure to indicate whether each of the data blocks in the second memory device have valid or invalid data; and indicate in the data block validity data structure that one of the data blocks in the second memory device is invalid in response to performing a copy-on write to write an update to the data block to a new data block or deleting the data block.

In Example 18, the subject matter of examples 12-17 can optionally that the computer program is further executed to: maintain defragmentation units, wherein each of the defragmentation units groups at least one data block in the second memory device; indicate, for each of the defragmentation units, a number of data blocks indicated as invalid in the data block validity data structure and a number of program/erase cycles to the data blocks; use the number of the data blocks indicated as invalid and the number of program/erase cycles for the defragmentation units to select defragmentation units to defragment; perform defragmentation with respect to the selected defragmentation units; indicate in the data block data structure that the data blocks subject to the defragmentation are free; and indicate in the data block validity data structure that the data blocks subject to the defragmentation are valid.

Example 19 is a method for using different types of storage devices for metadata and file data, comprising: determining an available physical address in a first memory device, comprising a byte addressable non-volatile memory, for a data block to allocate for metadata for a file or directory in a file system; determining a first logical address corresponding to the available physical address in the first memory device in a first range of logical addresses corresponding to physical addresses in the first memory device; providing the first logical address to use for the metadata; determining an available physical address in a second memory device, comprising a block addressable read-modify write non-volatile memory, for a data block to allocate for the file or directory in the file system; determining a second logical address corresponding to the available physical address in the second memory device in a second range of logical addresses corresponding to physical addresses in the second memory device; and providing the second logical address to use to access the data block allocated to the file or directory in the file system.

In Example 20, the subject matter of examples 19 and 21-25 can optionally include that the first range of logical addresses comprise a range of the physical addresses, and wherein the second range of logical addresses comprise corresponding physical addresses adjusted by an offset.

In Example 21, the subject matter of examples 19, 20 and 22-25 can optionally include that metadata for files in the file system is only allocated logical addresses in the first range of logical addresses and wherein data blocks for the files in the file system are only allocated logical addresses in the second range of logical addresses, where the second memory device comprises a copy-on write memory device to write updates to a data block to a new data block and wherein the first memory device writes updates to a data block directly to the data block subject to an update.

In Example 22, the subject matter of examples 19-21 and 23-25 can optionally include receiving a read or write request to a requested logical address; in response to the requested logical address corresponding to a physical address in the first range of logical addresses, transmitting the read or write request in a first memory device protocol used by the first memory device to the first memory device; and in response to the requested logical address corresponding to a physical address in the second range of logical addresses, transmitting the read or write request in a second memory device protocol used by the second memory device to the second memory device, wherein the first and second memory devices comprise different types of memory devices using different memory device protocols.

In Example 23, the subject matter of examples 19-22 and 24-25 can optionally include that the read or write request in the first memory device protocol to transmit includes the requested logical address as the physical address in the read or write request, and wherein in response to the requested logical address corresponding to a physical address in the second range of logical addresses, convert the requested logical address to a corresponding physical address to include in the read or write request to transmit to the second memory device protocol.

In Example 24, the subject matter of examples 19-23 and 25 can optionally include maintaining a data block data structure to indicate data blocks in the second memory device as free or used, wherein the determined available physical address is for one of the data blocks indicated in the data block data structure as free; maintaining a data block validity data structure to indicate whether each of the data blocks in the second memory device have valid or invalid data; and indicating in the data block validity data structure that one of the data blocks in the second memory device is invalid in response to performing a copy-on write to write an update to the data block to a new data block or deleting the data block.

In Example 25, the subject matter of examples 19-24 can optionally include maintaining defragmentation units, wherein each of the defragmentation units groups at least one data block in the second memory device; indicating, for each of the defragmentation units, a number of data blocks indicated as invalid in the data block validity data structure and a number of program/erase cycles to the data blocks; using the number of the data blocks indicated as invalid and the number of program/erase cycles for the defragmentation units to select defragmentation units to defragment; performing defragmentation with respect to the selected defragmentation units; indicating in the data block data structure that the data blocks subject to the defragmentation are free; and indicating in the data block validity data structure that the data blocks subject to the defragmentation are valid.

Example 26 is a system for using different types of storage devices for metadata and file data, wherein the system is in communication with a first memory device comprising a byte addressable non-volatile memory and a second memory device a block addressable read-modify write non-volatile memory, comprising: a processor; and a computer readable storage medium having computer program code executed by the processor to: determine an available physical address in the first memory device for a data block to allocate for metadata for a file or directory in a file system; determine a first logical address corresponding to the available physical address in the first memory device in a first range of logical addresses corresponding to physical addresses in the first memory device; provide the first logical address to use for the metadata; determine an available physical address in the second memory device for a data block to allocate for the file or directory in the file system; determine a second logical address corresponding to the available physical address in the second memory device in a second range of logical addresses corresponding to physical addresses in the second memory device; and provide the second logical address to use to access the data block allocated to the file or directory in the file system.

In Example 27, the subject matter of examples 26 and 28-32 can optionally include that the first range of logical addresses comprise a range of the physical addresses, and wherein the second range of logical addresses comprise corresponding physical addresses adjusted by an offset.

In Example 28, the subject matter of examples 26, 27 and 29-32 can optionally include that metadata for files in the file system is only allocated logical addresses in the first range of logical addresses and wherein data blocks for the files in the file system are only allocated logical addresses in the second range of logical addresses, where the second memory device comprises a copy-on write memory device to write updates to a data block to a new data block and wherein the first memory device writes updates to a data block directly to the data block subject to an update.

In Example 29, the subject matter of examples 26-28 and 30-32 can optionally include that the computer program is further executed to: receive a read or write request to a requested logical address; in response to the requested logical address corresponding to a physical address in the first range of logical addresses, transmit the read or write request in a first memory device protocol used by the first memory device to the first memory device; and in response to the requested logical address corresponding to a physical address in the second range of logical addresses, transmit the read or write request in a second memory device protocol used by the second memory device to the second memory device, wherein the first and second memory devices comprise different types of memory devices using different memory device protocols.

In Example 30, the subject matter of examples 26-29 and 31-32 can optionally include that the read or write request in the first memory device protocol to transmit includes the requested logical address as the physical address in the read or write request, and wherein in response to the requested logical address corresponding to a physical address in the second range of logical addresses, convert the requested logical address to a corresponding physical address to include in the read or write request to transmit to the second memory device protocol.

In Example 31, the subject matter of examples 26-30 and 32 can optionally include that the computer program is further executed to: maintain a data block data structure to indicate data blocks in the second memory device as free or used, wherein the determined available physical address is for one of the data blocks indicated in the data block data structure as free; maintain a data block validity data structure to indicate whether each of the data blocks in the second memory device have valid or invalid data; and indicate in the data block validity data structure that one of the data blocks in the second memory device is invalid in response to performing a copy-on write to write an update to the data block to a new data block or deleting the data block.

In Example 32, the subject matter of examples 26-31 can optionally include that the computer program is further executed to: maintain defragmentation units, wherein each of the defragmentation units groups at least one data block in the second memory device; indicate, for each of the defragmentation units, a number of data blocks indicated as invalid in the data block validity data structure and a number of program/erase cycles to the data blocks; use the number of the data blocks indicated as invalid and the number of program/erase cycles for the defragmentation units to select defragmentation units to defragment; perform defragmentation with respect to the selected defragmentation units; indicate in the data block data structure that the data blocks subject to the defragmentation are free; and indicate in the data block validity data structure that the data blocks subject to the defragmentation are valid.

Example 33 is an apparatus for using different types of storage devices for metadata and file data, comprising: means for determining an available physical address in a first memory device, comprising a byte addressable non-volatile memory, for a data block to allocate for metadata for a file or directory in a file system; means for determining a first logical address corresponding to the available physical address in the first memory device in a first range of logical addresses corresponding to physical addresses in the first memory device; means for providing the first logical address to use for the metadata; means for determining an available physical address in a second memory device, comprising a block addressable read-modify write non-volatile memory, for a data block to allocate for the file or directory in the file system; means for determining a second logical address corresponding to the available physical address in the second memory device in a second range of logical addresses corresponding to physical addresses in the second memory device; and means for providing the second logical address to use to access the data block allocated to the file or directory in the file system.

What is claimed:

1. A storage system, comprising:
   a hybrid storage device having a first memory device comprising a byte addressable non-volatile memory and a second memory device comprising a block addressable read-modify write non-volatile memory; and
   a computer readable storage medium including a computer program executed by a processor to:
     determine an available physical address in the first memory device for a data block to allocate for metadata for a file or directory in a file system;
     determine a first logical address corresponding to the available physical address in the first memory device in a first range of logical addresses corresponding to physical addresses in the first memory device;
     provide the first logical address to use for the metadata;
     determine an available physical address in the second memory device for a data block to allocate for the file or directory in the file system;
     determine a second logical address corresponding to the available physical address in the second memory device in a second range of logical addresses corresponding to physical addresses in the second memory device; and
     provide the second logical address to use to access the data block allocated to the file or directory in the file system.

2. The storage system of claim 1, wherein the first range of logical addresses comprise a range of the physical addresses, and wherein the second range of logical addresses comprise corresponding physical addresses adjusted by an offset.

3. The storage system of claim 1, wherein metadata for files in the file system is only allocated logical addresses in the first range of logical addresses and wherein data blocks for the files in the file system are only allocated logical addresses in the second range of logical addresses, where the second memory device comprises a copy-on write memory device to write updates to a data block to a new data block and wherein the first memory device writes updates to a data block directly to the data block subject to an update.

4. The storage system of claim 1, wherein the computer program is further executed to:
   receive a read or write request to a requested logical address;
   in response to the requested logical address corresponding to a physical address in the first range of logical addresses, transmit the read or write request in a first memory device protocol used by the first memory device to the first memory device; and
   in response to the requested logical address corresponding to a physical address in the second range of logical addresses, transmit the read or write request in a second memory device protocol used by the second memory device to the second memory device, wherein the first and second memory devices comprise different types of memory devices using different memory device protocols.

5. The storage system of claim 4, wherein the read or write request in the first memory device protocol to transmit includes the requested logical address as the physical address in the read or write request, and wherein in response to the requested logical address corresponding to a physical address in the second range of logical addresses, convert the requested logical address to a corresponding physical address to include in the read or write request to transmit to the second memory device protocol.

6. The storage system of claim 4, wherein the read or write request in the first memory device protocol and the second memory device protocol to transmit includes the requested logical address, wherein the first memory device uses the requested logical address as the physical address to process the read or write request in the first memory device protocol, and wherein the second memory device adjusts the requested logical address by an offset to determine a physical address to use in the read or write request in the second memory device protocol.

7. The storage system of claim 1, wherein the computer program is further executed to:
   maintain a data block data structure to indicate data blocks in the second memory device as free or used, wherein the determined available physical address is for one of the data blocks indicated in the data block data structure as free;
   maintain a data block validity data structure to indicate whether each of the data blocks in the second memory device have valid or invalid data; and indicate in the data block validity data structure that one of the data blocks in the second memory device is invalid in response to performing a copy-on write to write an update to the data block to a new data block or deleting the data block.

8. The storage system of claim 7, wherein the computer program is further executed to:
maintain defragmentation units, wherein each of the defragmentation units groups at least one data block in the second memory device;
indicate, for each of the defragmentation units, a number of data blocks indicated as invalid in the data block validity data structure and a number of program/erase cycles to the data blocks;
use the number of the data blocks indicated as invalid and the number of program/erase cycles for the defragmentation units to select defragmentation units to defragment;
perform defragmentation with respect to the selected defragmentation units;
indicate in the data block data structure that the data blocks subject to the defragmentation are free; and
indicate in the data block validity data structure that the data blocks subject to the defragmentation are valid.

9. The storage system of claim 8, wherein the data block data structure, the data block validity data structure, and a number of program/erase cycles to the data blocks are stored in the first memory device.

10. The storage system of claim 1, wherein the computer program is further executed to:
maintain a data block data structure to indicate data blocks in the second memory device as free or used, wherein the determined available physical address comprises one of the data blocks indicated in the data block data structure as free;
maintain a data block validity data structure to indicate whether each of the data blocks in the second memory device have valid or invalid data;
receive a write request having write data to write to a target logical address corresponding to a target physical address in the second memory device;
indicate in the data block validity data structure that the data block corresponding to the target physical address in the second memory device is invalid;
determine from the data block data structure an available physical address indicated as free for an updated data block;
indicate in the data block data structure that the determined available physical address of the updated data block is used; and
write data in the data block at the target logical address and the write data to the updated data block.

11. The storage system of claim 1, wherein the metadata for files and directories in the file system are stored in data blocks in the first memory device, wherein each metadata instance for the files and directories indicates a data block in the second memory device storing data for the metadata instance, wherein the data blocks in the second memory device for metadata instances for a directory include identifiers of metadata instances of sub-directories of the directory, and wherein the data block for a metadata instance for a file indicates the data blocks storing data for the file represented by the metadata instance.

12. A computer program product comprising a computer readable storage medium including a computer program executed by a processor and in communication with a first memory device comprising a byte addressable non-volatile memory and a second memory device a block addressable read-modify write non-volatile memory, wherein the computer program is executed to:
determine an available physical address in the first memory device for a data block to allocate for metadata for a file or directory in a file system;
determine a first logical address corresponding to the available physical address in the first memory device in a first range of logical addresses corresponding to physical addresses in the first memory device;
provide the first logical address to use for the metadata;
determine an available physical address in the second memory device for a data block to allocate for the file or directory in the file system;
determine a second logical address corresponding to the available physical address in the second memory device in a second range of logical addresses corresponding to physical addresses in the second memory device; and
provide the second logical address to use to access the data block allocated to the file or directory in the file system.

13. The computer program product of claim 12, wherein the first range of logical addresses comprise a range of the physical addresses, and wherein the second range of logical addresses comprise corresponding physical addresses adjusted by an offset.

14. The computer program product of claim 12, wherein metadata for files in the file system is only allocated logical addresses in the first range of logical addresses and wherein data blocks for the files in the file system are only allocated logical addresses in the second range of logical addresses, where the second memory device comprises a copy-on write memory device to write updates to a data block to a new data block and wherein the first memory device writes updates to a data block directly to the data block subject to an update.

15. The computer program product of claim 12, wherein the computer program is further executed to:
receive a read or write request to a requested logical address;
in response to the requested logical address corresponding to a physical address in the first range of logical addresses, transmit the read or write request in a first memory device protocol used by the first memory device to the first memory device; and
in response to the requested logical address corresponding to a physical address in the second range of logical addresses, transmit the read or write request in a second memory device protocol used by the second memory device to the second memory device, wherein the first and second memory devices comprise different types of memory devices using different memory device protocols.

16. The computer program product of claim 15, wherein the read or write request in the first memory device protocol to transmit includes the requested logical address as the physical address in the read or write request, and wherein in response to the requested logical address corresponding to a physical address in the second range of logical addresses, convert the requested logical address to a corresponding physical address to include in the read or write request to transmit to the second memory device protocol.

17. The computer program product of claim 12, wherein the computer program is further executed to:
maintain a data block data structure to indicate data blocks in the second memory device as free or used, wherein the determined available physical address is for one of the data blocks indicated in the data block data structure as free;
maintain a data block validity data structure to indicate whether each of the data blocks in the second memory device have valid or invalid data; and
indicate in the data block validity data structure that one of the data blocks in the second memory device is invalid in response to performing a copy-on write to write an update to the data block to a new data block or deleting the data block.

18. The computer program product of claim 17, wherein the computer program is further executed to:
maintain defragmentation units, wherein each of the defragmentation units groups at least one data block in the second memory device;
indicate, for each of the defragmentation units, a number of data blocks indicated as invalid in the data block validity data structure and a number of program/erase cycles to the data blocks;
use the number of the data blocks indicated as invalid and the number of program/erase cycles for the defragmentation units to select defragmentation units to defragment;
perform defragmentation with respect to the selected defragmentation units;
indicate in the data block data structure that the data blocks subject to the defragmentation are free; and
indicate in the data block validity data structure that the data blocks subject to the defragmentation are valid.

19. A method, comprising:
determining an available physical address in a first memory device, comprising a byte addressable non-volatile memory, for a data block to allocate for metadata for a file or directory in a file system;
determining a first logical address corresponding to the available physical address in the first memory device in a first range of logical addresses corresponding to physical addresses in the first memory device;
providing the first logical address to use for the metadata;
determining an available physical address in a second memory device, comprising a block addressable read-modify write non-volatile memory, for a data block to allocate for the file or directory in the file system;
determining a second logical address corresponding to the available physical address in the second memory device in a second range of logical addresses corresponding to physical addresses in the second memory device; and
providing the second logical address to use to access the data block allocated to the file or directory in the file system.

20. The method of claim 19, wherein the first range of logical addresses comprise a range of the physical addresses, and wherein the second range of logical addresses comprise corresponding physical addresses adjusted by an offset.

21. The method of claim 19, wherein metadata for files in the file system is only allocated logical addresses in the first range of logical addresses and wherein data blocks for the files in the file system are only allocated logical addresses in the second range of logical addresses, where the second memory device comprises a copy-on write memory device to write updates to a data block to a new data block and wherein the first memory device writes updates to a data block directly to the data block subject to an update.

22. The method of claim 19, further comprising:
receiving a read or write request to a requested logical address;
in response to the requested logical address corresponding to a physical address in the first range of logical addresses, transmitting the read or write request in a first memory device protocol used by the first memory device to the first memory device; and
in response to the requested logical address corresponding to a physical address in the second range of logical addresses, transmitting the read or write request in a second memory device protocol used by the second memory device to the second memory device, wherein the first and second memory devices comprise different types of memory devices using different memory device protocols.

23. The method of claim 22, wherein the read or write request in the first memory device protocol to transmit includes the requested logical address as the physical address in the read or write request, and wherein in response to the requested logical address corresponding to a physical address in the second range of logical addresses, convert the requested logical address to a corresponding physical address to include in the read or write request to transmit to the second memory device protocol.

24. The method of claim 19, further comprising:
maintaining a data block data structure to indicate data blocks in the second memory device as free or used, wherein the determined available physical address is for one of the data blocks indicated in the data block data structure as free;
maintaining a data block validity data structure to indicate whether each of the data blocks in the second memory device have valid or invalid data; and
indicating in the data block validity data structure that one of the data blocks in the second memory device is invalid in response to performing a copy-on write to write an update to the data block to a new data block or deleting the data block.

25. The method of claim 24, further comprising:
maintaining defragmentation units, wherein each of the defragmentation units groups at least one data block in the second memory device;
indicating, for each of the defragmentation units, a number of data blocks indicated as invalid in the data block validity data structure and a number of program/erase cycles to the data blocks;
using the number of the data blocks indicated as invalid and the number of program/erase cycles for the defragmentation units to select defragmentation units to defragment;
performing defragmentation with respect to the selected defragmentation units;
indicating in the data block data structure that the data blocks subject to the defragmentation are free; and
indicating in the data block validity data structure that the data blocks subject to the defragmentation are valid.

* * * * *